United States Patent
Simopoulos

(12) 
(10) Patent No.: US 6,473,317 B1
(45) Date of Patent: Oct. 29, 2002

(54) FORWARD DC/DC CONVERTER WITH SEMI-SYNCHRONOUS RECTIFICATION AND IMPROVED EFFICIENCY

(76) Inventor: Anastasios A. Simopoulos, 2 Otis Pratt La., Middleboro, MA (US) 02346

( * ) Notice: Subject to any disclaimer, the term of this patent is extended or adjusted under 35 U.S.C. 154(b) by 0 days.

(21) Appl. No.: 09/940,133

(22) Filed: Aug. 27, 2001

(51) Int. Cl.[7] ............................................... H02M 3/335
(52) U.S. Cl. ................................................... 363/21.06
(58) Field of Search .......................... 363/21.06, 21.14, 363/21.02, 131, 98, 89

(56) References Cited

U.S. PATENT DOCUMENTS

| | | | |
|---|---|---|---|
| 4,441,146 A | | 4/1984 | Vinciarelli |
| 5,726,869 A | * | 3/1998 | Yamashita et al. ........ 363/21.06 |
| 6,061,255 A | * | 5/2000 | Chik et al. ................ 363/21.06 |
| 6,297,970 B2 | * | 10/2001 | Hemena et al. .......... 363/21.06 |

* cited by examiner

*Primary Examiner*—Shawn Riley
(74) *Attorney, Agent, or Firm*—Cesari and McKenna, LLP; Kevin H. Paul, Esq.

(57) ABSTRACT

A forward DC/DC converter using semi-synchronous MOSFET rectifiers with a peak detector and a pulse transformer. In another example edge triggered circuits and active clamps are used. The gate driving signal for one MOSFET is derived from the secondary of the input power transformer, but the second MOSFET gate is driven from a combination of the secondary of the input power transformer and the pulse transformer. The second MOSFET remains on during the core reset and dead time periods thereby providing a low voltage current path for the load current.

4 Claims, 12 Drawing Sheets

FORWARD DC/DC CONVERTER WITH SEMI-SYNCHRONOUS RECTIFICATION AND IMPROVED EFFICIENCY

TECHNICAL FIELD OF THE INVENTION

This invention relates to switching-type power converters and in particularly to forward and flyback-type DC/DC converters that use MOSFET devices used as synchronous output rectifiers with gates that are driven by the secondary voltage signal of the power transformer.

BACKGROUND OF THE INVENTION

The inefficiency of MOSFET devices as self-driven synchronous rectifiers in prior art buck-driven converters has limited their use. Also, the reset voltage for the transformer core in forward converters designed without an active clamp limits the conduction time of one of the MOSFET devices in the synchronous rectifiers, thereby decreasing the efficiency of the converter.

In the prior art forward converter shown in FIG. 1A, an isolating power transformer is combined with a self-synchronized synchronous rectifier. In such a rectifier the gates of the MOSFET rectifiers Q2 and Q3 are driven by the secondary winding 108 of the power transformer.

A DC input voltage 100, Vin, is connected to the primary winding 106 of the power transformer by a MOSFET power switch Q1 104. The secondary winding 108 is connected to an output lead 118 through an output filter inductor 114 and the synchronous rectifier MOSFET devices Q2 110 and Q3 112. Each rectifying MOSFET device includes an inherent body diode 120 and 122, respectively.

When Q1 104 is conducting, the input voltage Vin 100 is applied directly across the primary winding 106. The secondary winding 108 provides a current flow through the inductor 114, a load connected to the output lead 118, and back through the MOSFET rectifier Q2 110 to the secondary winding 108. Continuity of the current flow in the inductor 114 is maintained via the MOSFET rectifier Q3 112. An output filter capacitor 116 shunts the output of the converter and the load (not shown).

FIG. 1B shows the voltage and current waveforms of the converter of FIG. 1A. When the pulse width modulator (PWM) 102 turns off MOSFET Q1 104, disconnecting the primary winding 106 of the power transformer, the drain voltage of Q1 140 rises and, due to parasitic capacitances, assumes a sinusoidal wave-form from t0 to t1. During this time t0–t1, the power transformer core resets itself (reset period). The sinusoidal portion of 140 appears at the drain of Q2 and the gate of Q3 as shown in the trace 142. During this reset period the current through Q2 IQ2 drops to zero and all the current through the inductor 114 is supplied by Q3 shown in trace 148. Specifically the current through Q3 IQ3 148 assumes its maximum at t0 and then linearly decreases from t0 to t1.

Still referring to FIG. 1B, from t1 to t2, both MOSFET rectifiers Q2 and Q3 are off because the gate driving signals of both Q2 144 and Q3 142 are zero. The period from t1 to t2 is referred to as the "dead time" period in which no power transfer or transformer core resetting takes place. During this dead time, the inductor 114 current, IL, in trace 150 continues to flow through the body diodes of Q3 122 and Q2 120. Most of the inductor current flows through 122 since the secondary winding 108 is in series with diode 120.

There is a loss of efficiency during this dead time since the forward voltage drop of the MOSFET body diodes is about 1 volt as compared to 0.1 volts when the MOSFET is on. Moreover, as the input voltage, Vin, increases the dead time period increases and the efficiency of the converter decreases. At maximum input voltage, the inefficiency of the prior art DC converter is greatest.

At the end of the dead time, t2, the gate voltage of Q2 110 is zero, the secondary momentarily forward biases the body diode 120 of Q2 110 allowing the secondary current to flow. As soon as the dotted end of secondary 108 exceeds the gate threshold voltage of Q2 110, Q2 turns on supplying all the secondary current.

From t2 to t3, Q1 104 turns on again (the power transfer period of the conversion cycle) and Q2 110 turns on connecting the secondary 108 of T1 through inductor 114 to the output terminal 118 and any load across Vo.

During t2–t3, load current is carried through the secondary 108 and Q2 110. During this time energy is stored in the output inductor 114 and on the output capacitor 116. The gate driving signal for Q2 110 is shown in trace 144, which is the inverted lower part of the drain waveform of Q1 140.

Driving the MOSFET synchronous rectifiers directly from the transformer secondary reduces the efficiency of the converter. Even though the self-driven synchronous rectifiers in the forward converter are simple and low-cost, the inherent low efficiency reduces the maximum possible power density of the converter, raises the converter's temperature, thereby lowering its reliability and making the converter unsuitable for high-power density applications.

Therefore there is a need for an efficiency improved version of a forward unclamped converter with synchronous rectifiers.

Forward converter designs using an "active clamp" to clamp the primary voltage generated during the dead time period also suffer from inefficiencies, especially when the input voltage is at its maximum. Typically, DC converters must operate over a 2:1 input voltage range. Forward converters with an active clamp require more complex timing circuitry and additional power MOSFETs. A prior art active clamp circuit is described U.S. Pat. No. 4,441,146 assigned to Vicor Corporation..

SUMMARY OF THE INVENTION

In view of the foregoing background discussion, the present invention provides the combining of primary and secondary signals in an unclamped forward converter to generate the gate drive signals for MOSFET synchronous rectifiers. During the power transfer period, a first MOSFET, which connects the secondary of the transformer to load return (usually ground), is directly driven from the secondary. However, a second MOSFET synchronous rectifier is driven from a combination of the transformer secondary and a second pulse transformer. The second MOSFET rectifier is turned on and remains on during the reset and dead time period of the conversion, its gate drive signal starts at the beginning of the reset period and terminates prior to the start of the power transfer period.

The advantage is having the second MOSFET is on and supplying current rather than having the current travel through its intrinsic diode. Therefore there is better conversion efficiency due to the lower voltage drop across the on MOSFET as compared to its intrinsic diode.

DESCRIPTION OF DIAGRAMS

For a more complete understanding of the present invention and its advantages, please reference the following descriptions with the accompanying drawings.

DETAILED DESCRIPTION OF PREFERRED EMBODIMENTS

Figure 1A:
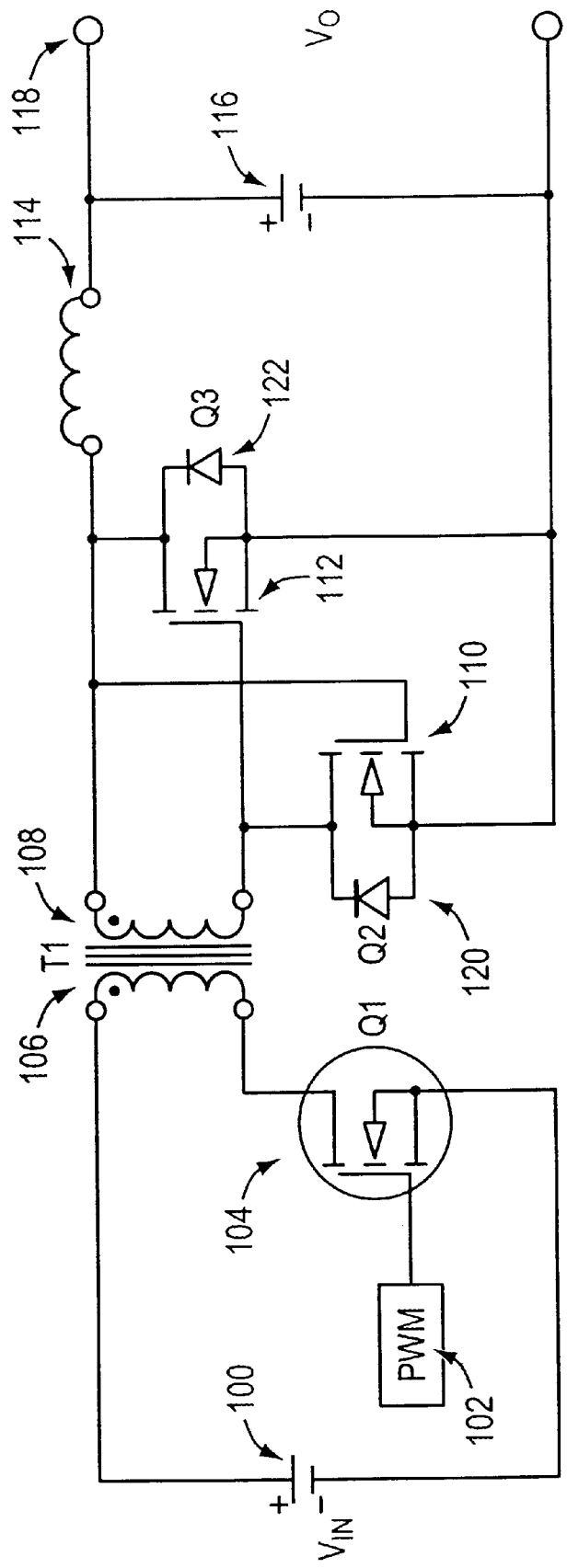
FIG. 1A is a schematic of a forward-type converter of the prior art employing a synchronous rectifier.
Figure 2A:
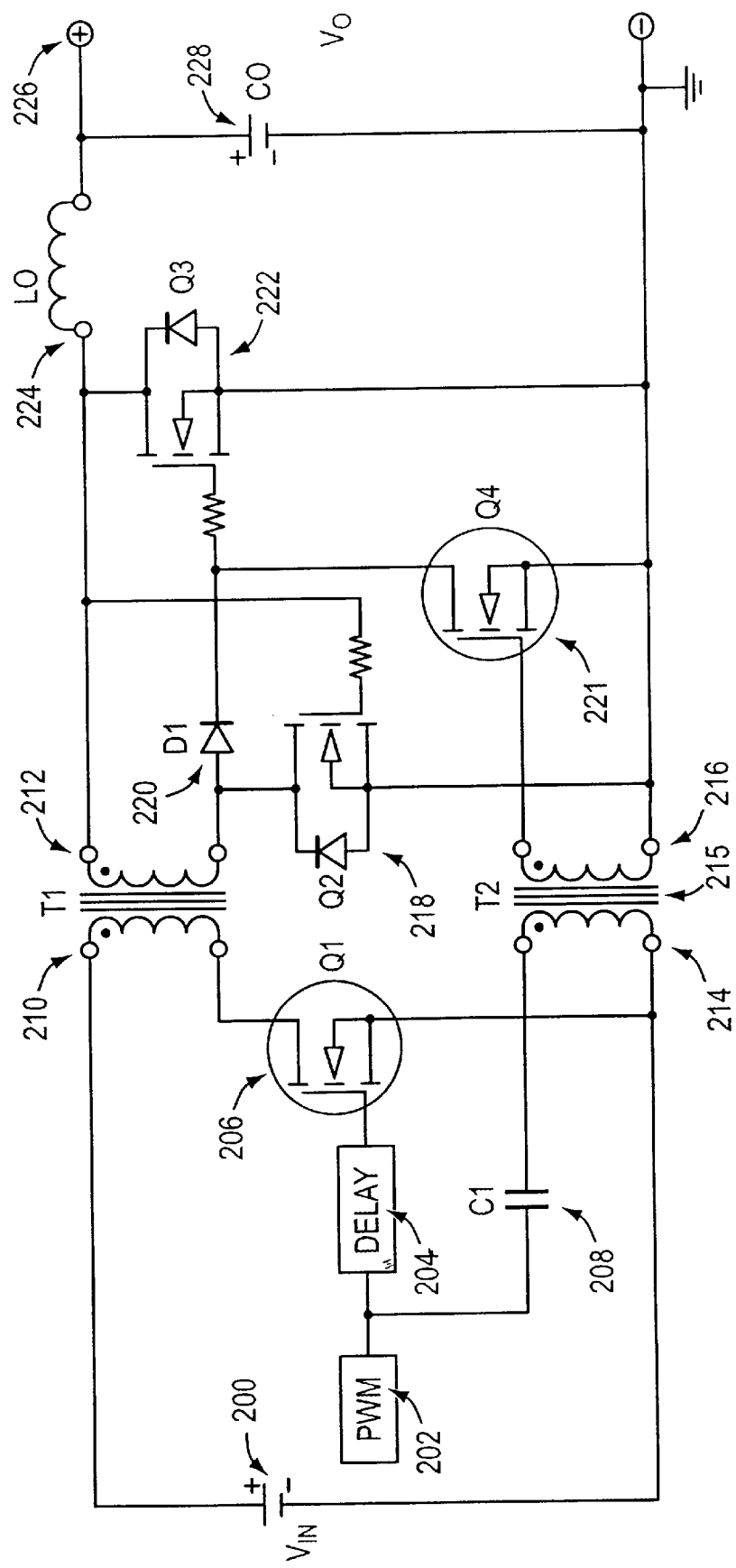
FIGS. 2A and 2B are a schematic and associated waveforms, respectively describing an embodiment of the present invention.
Figure 2B:
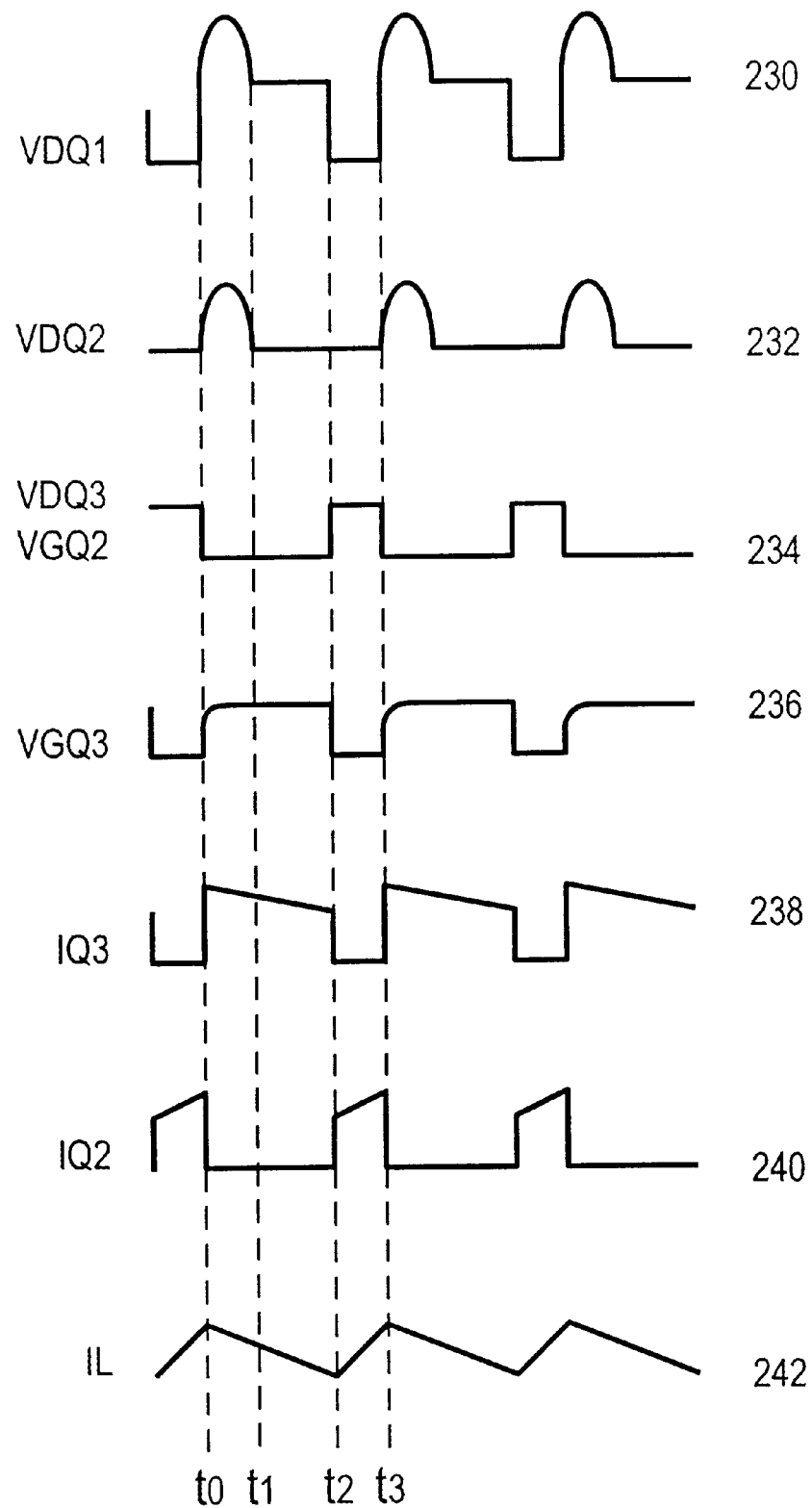

FIGS. 2A and 2B present a forward converter with semi-self driven synchronous MOSFET rectifiers. The circuit is derived from the circuit in FIG. 1A by adding four discrete low-cost parts D1 220, Q4 221, T2 215, C1 208 and a delay circuit 204. The voltage and current waveforms for the forward converter in FIG. 2A are shown graphically by the traces in FIG. 2B. The operation of the circuit in FIG. 2A is similar to that described for the circuit in FIG. 1A but with a different driving signal for the synchronous MOSFET rectifier Q3 220.

Referring to both FIGS. 2A and 2B, at t0 the power transformer T1 begins its core reset cycle. At the same time, the gate driving signal of Q2 218 goes low (waveform 234), the drain of Q2 218 (waveform 232), starts going high and through D1 220 charges the gate to source capacitor of MOSFET Q3 222 turning it on. Diode D1 220 and the gate to source capacitance of Q3 222 act as a voltage peak detector for the drain voltage of Q2 218 waveform 232. The gate of Q3 222 will remain charged (Q3 on) during the reset and the dead time period up to a few nanoseconds prior to t2 (power transferring period of T1). At t2 minus the delay 304, the gate charge of Q3 222 is removed by the low-power MOSFET Q4 221. The secondary 216 of the pulse transformer 215 drives the gate of Q4 221. The primary 214 of T2 215 is AC-coupled to the output of the PWM 202 through capacitor C1 208. As the new power transferring cycle begins (t2 to t3), the output of PWM 202 goes high. The output is delayed 204 before arriving at the gate of Q1 206.

Assuming the propagation delay through C1 208 and T2 215 is equal to that of power transformer T1, the delay of 204 is arranged equal to the delay through Q4 221 and Q3 222. In this case, Q3 will be turned off just prior to t2 or the beginning of the power transfer period t2 to t3. To those familiar with the art, it should be obvious that the delay 204 can be implemented by adding a small series resistor from the output of PWM 202 to the gate of Q1, a fixed delay buffer or a combination of both. The parasitic gate to source capacitor of Q1 with the series added gate resistor forms a low-pass filter thus delaying the output of PWM 202. Typically, the delay 304 is about 50 to 100 ns.

The circuit of FIG. 2A as described above forces Q3 to remain on during the reset and the dead time periods described above. The body diodes of the synchronous MOSFET rectifier are off most of the time and the efficiency is improved by about 8% to 9% in comparison to the self-driven converter given in FIG. 1A.

Referring to FIG. 2B, the current waveforms of Q2 218 and Q3 222 are shown as IQ2 240 and IQ3 238, respectively. By comparing the current waveforms given in FIG. 1B for IQ2 and IQ3 to the same current waveforms in FIG. 2A for present invention, the MOSFET rectifier body diode conduction during the dead time period (t1–t2) is eliminated in FIG. 2B.

NOTE: If the I.R drop in the transistor channel is higher than the forward drop of the parasitic diodes, these diodes will conduct.

Figure 3:
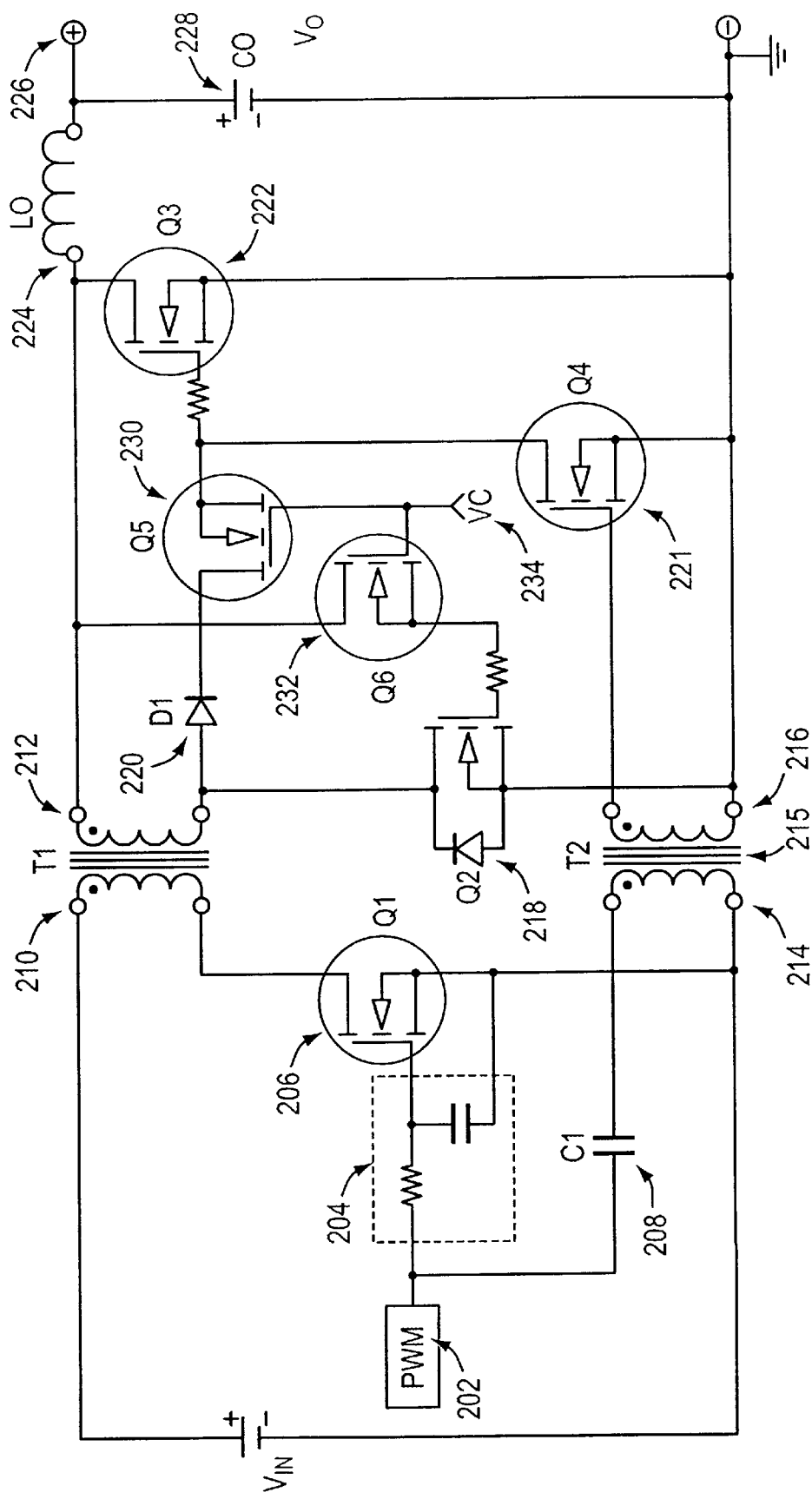
FIG. 3 is a schematic of an embodiment of the present invention implemented with gate voltage limiters for the synchronous rectifiers.

In FIG. 3, one of the preferred embodiments of the invention is shown. Two low-power MOSFETs are used as gate voltage limiters for Q2 218 and Q3 222, in case the secondary voltage of T1 222 exceeds the maximum gate voltage of the MOSFET synchronous rectifiers Q2 and Q3. Specifically Q5 230 is inserted between the cathode of D1 220 and the gate resistor of Q3 222. The drain terminal of Q5 230 is connected to the cathode of D1 220 and the source of Q5 230 is connected at the node of the drain of Q4 221 and the gate resistor of Q3 222. The gates Q5 230 and Q6 232 are driven from a control voltage VC 234. Voltage limiter Q6 232 has its source connected to the series gate resistor of Q2 218 and its drain of the node connecting the secondary of the power transformer T1 212 to the drain of Q3 222 and inductor LO 224. The control voltage VC 234 can be generated by a secondary winding(not shown) in T1 or LO and can be adjusted to any voltage level (be it DC or pulsating). Also Q5 230 and Q6 232 can be bipolar NPN Darlinton transistors, such as the Philips BST50, or a single NPN with a parallel diode oriented as the body diode in the N channel MOSFETs.

A 50-watt converter based on the FIG. 3 design was constructed within a 2" by 1".by 0.4" case using the following key components: PWM—UCC3807D 8-pin current mode; T1 Core—UG42011 Magnetics with 0.120" window; LO Core—Philips 3F3 material; T2 core—Toroid 40502-TC Magnetics W or H material; Q2, Q3—5$\mu$ 30VDS MOSFET I.R. (International Rectifiers); D1—1A Schottky 60V diode; Q4—VN 3205 Supertex; Q5, Q6—IRF 7341 Dual N Channel MOSFET.

In one example of the present invention a twenty layer printed circuit board is used for the power transformer T1 and inductor L0 winds, while the two outer surfaces are populated with the surface mounted devices (SMD). The twenty layer board is connected to the load and the input voltage through edge pins, which are mounted via through holes or surface mount.

A 15-amp converter with 48 volts input and a 3.3 volt output was built according to the present invention and tested. Its efficiency was 89%. The self-driven synchronous MOSFET rectifier design in FIG. 1A was built and tested with an efficiency of 81%.

Figure 4:
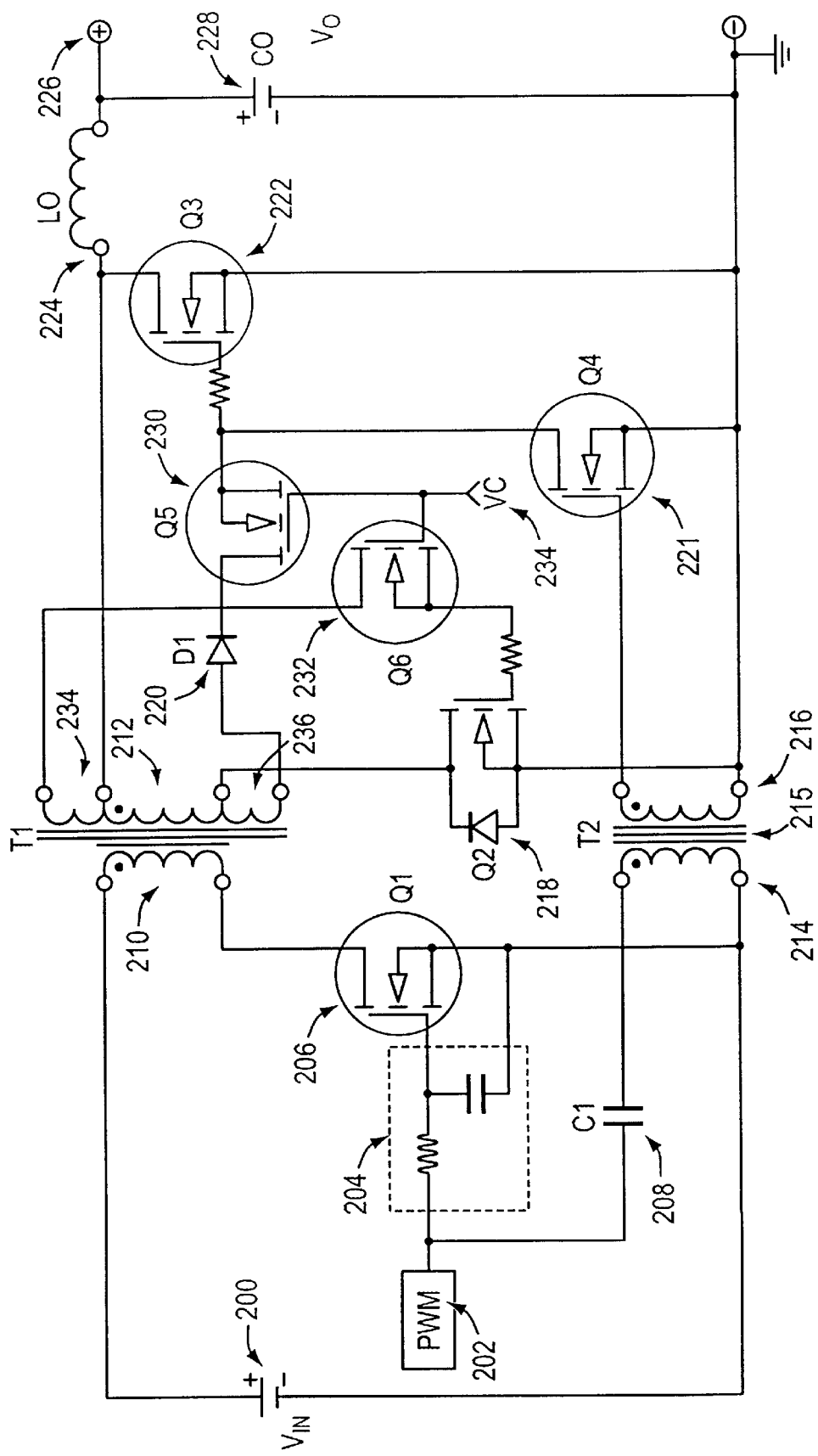
FIG. 4 is the schematic of an embodiment of the present invention with gate voltage limiters (FIG. 3) specifically with a boost in the secondary synchronous rectifier driving voltage to accommodate low output voltage or wide input voltage ranges.

For output voltages below 2 volts, the embodiment in FIG. 4 can be used. In FIG. 4, two auxiliary secondary winding 234 and 236 connected in series with the power secondary 212 are used to generate the needed gate voltages for Q3 222 and Q2 218.

The voltage limiters Q5 230 and Q6 232 can be removed if the input voltage to the converter varies only by a ratio of 2:1, e.g., from 72 volts to 36 volts. Both designs in FIGS. 3 and 4 offer wide input voltage range and minimum parts count, which reduces costs.

Figure 5A:
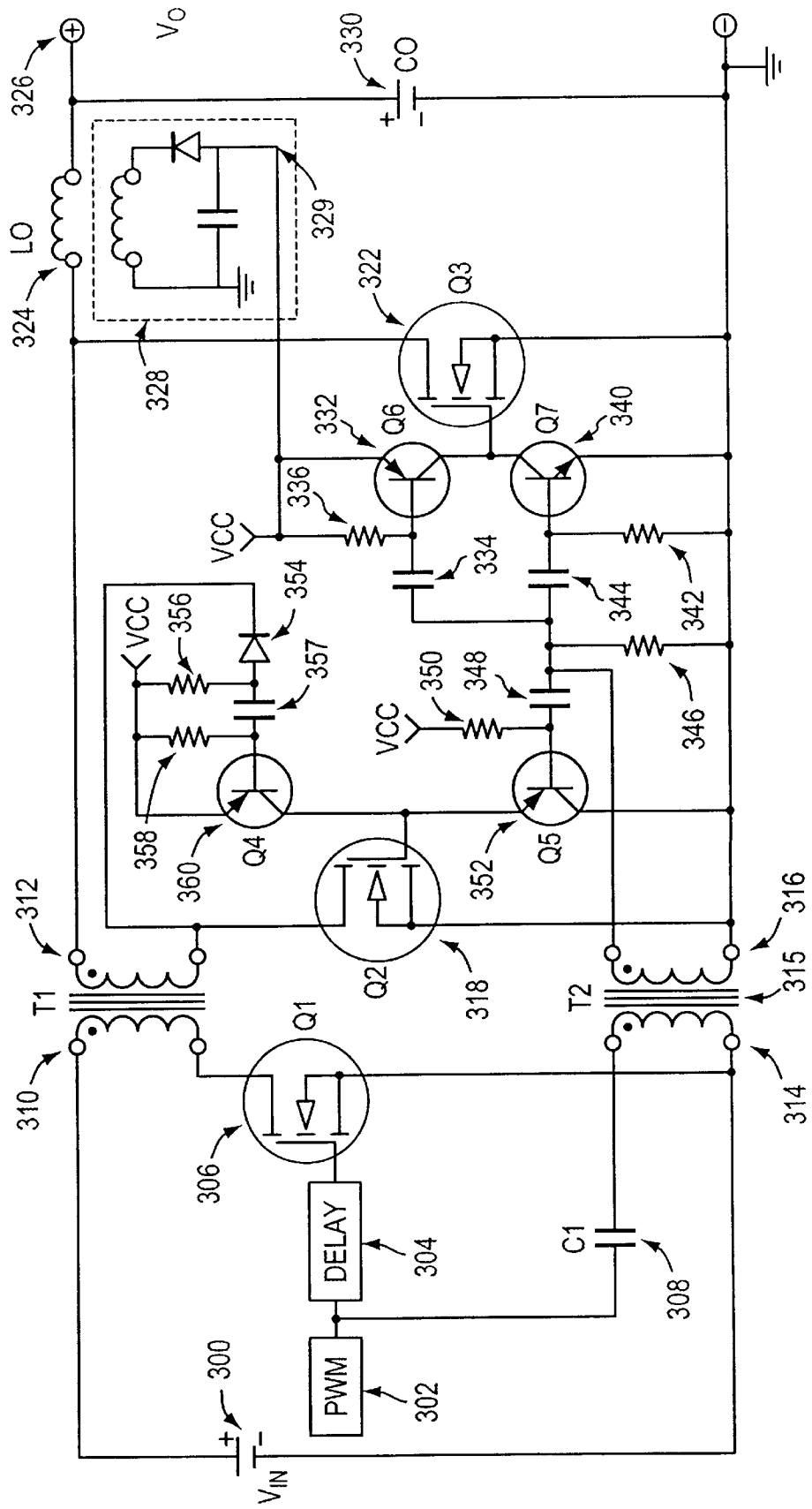
FIGS. 5A and 5B are schematics and associated waveforms, respectively, of an embodiment of the present invention with gates driven from a combination of input and output control signals.
Figure 5B:
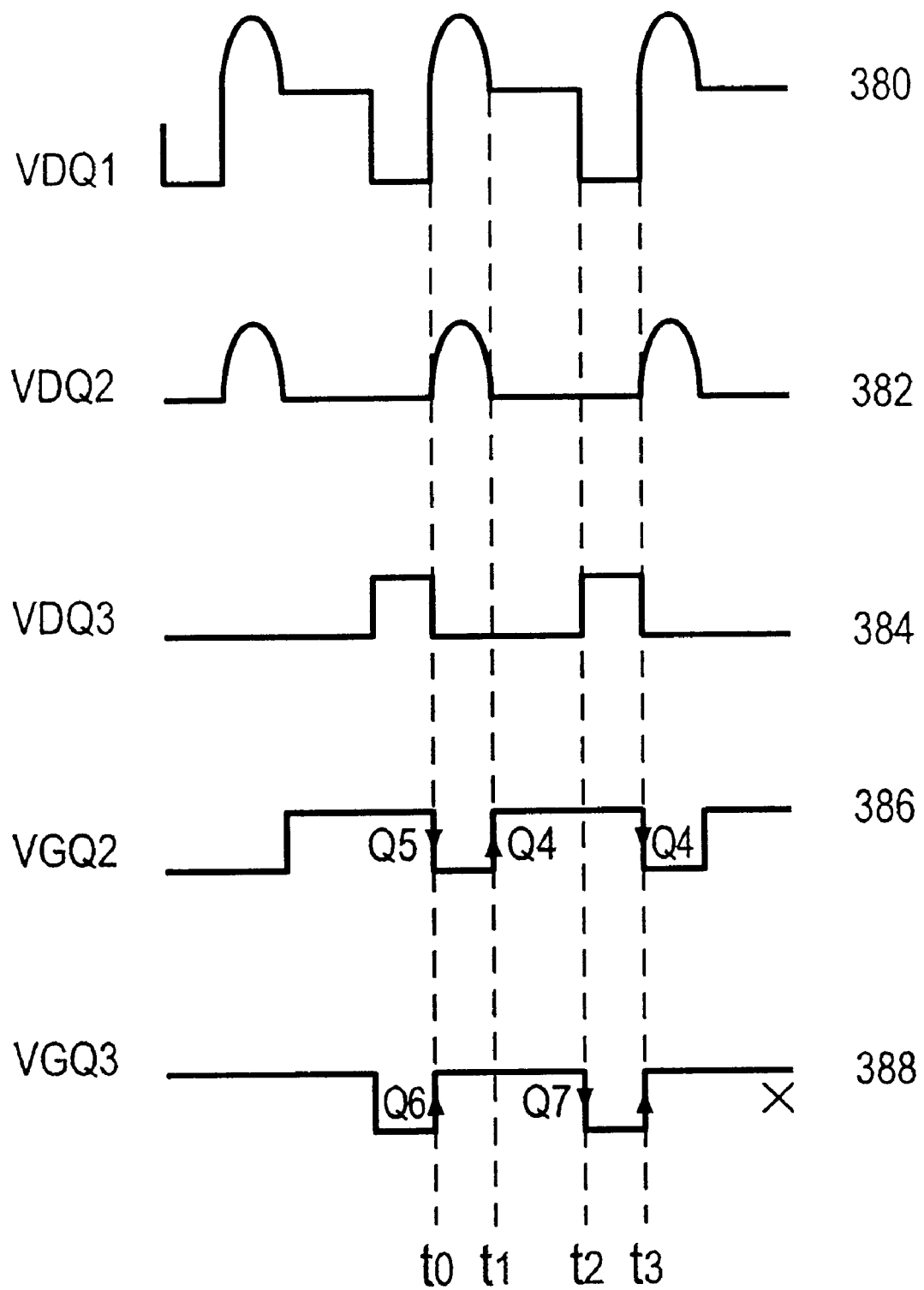

A schematic and timing waveform are shown in FIGS. 5A and 5B. This converter with synchronous MOSFET rectifiers Q2 318, Q3 322 is a semi-self-driven synchronous rectifier forward converter where the gate driving signal is generated by combining input and output control signals.

Bipolar transistors Q4, Q5, Q6, and Q7 are used as edge trigger devices to charge and discharge the gate to source capacitance of the synchronous rectifiers Q2 318, Q3 322. Specifically, at t0 the output of PWM 302 goes low and is delayed 304 before reaching Q1. In parallel, it travels via C1 308 and T2 315 and arrives at the node formed by capacitors 348, 344 and resistor 346.

The low going edge of the PWM 302 output via capacitor 348 momentarily turns on Q5 352 which in turn turns off Q2 318. The delay 304 is arranged so that Q1 is turned off at the same time as Q2. Also, at t0, the same low going edge of the PWM momentarily turns on Q6 332 through capacitor 334 turning on Q3 322. Both PNP transistors Q5 352 and Q6 332 must be able to carry the needed current for discharging and charging the synchronous MOSFET rectifier's parasitic capacitances, such as gate to source and drain to gate, etc.

At t1, the drain voltage of Q2 318 (FIG. 5B VDQ2 382) drops below a control voltage $V_{cc}$. Q2 318 is turned on again by the low-going edge, trace 382, at its drain. This low going voltage is transmitted via capacitor 357 and PNP transistor Q4 360.

Figure 1B:
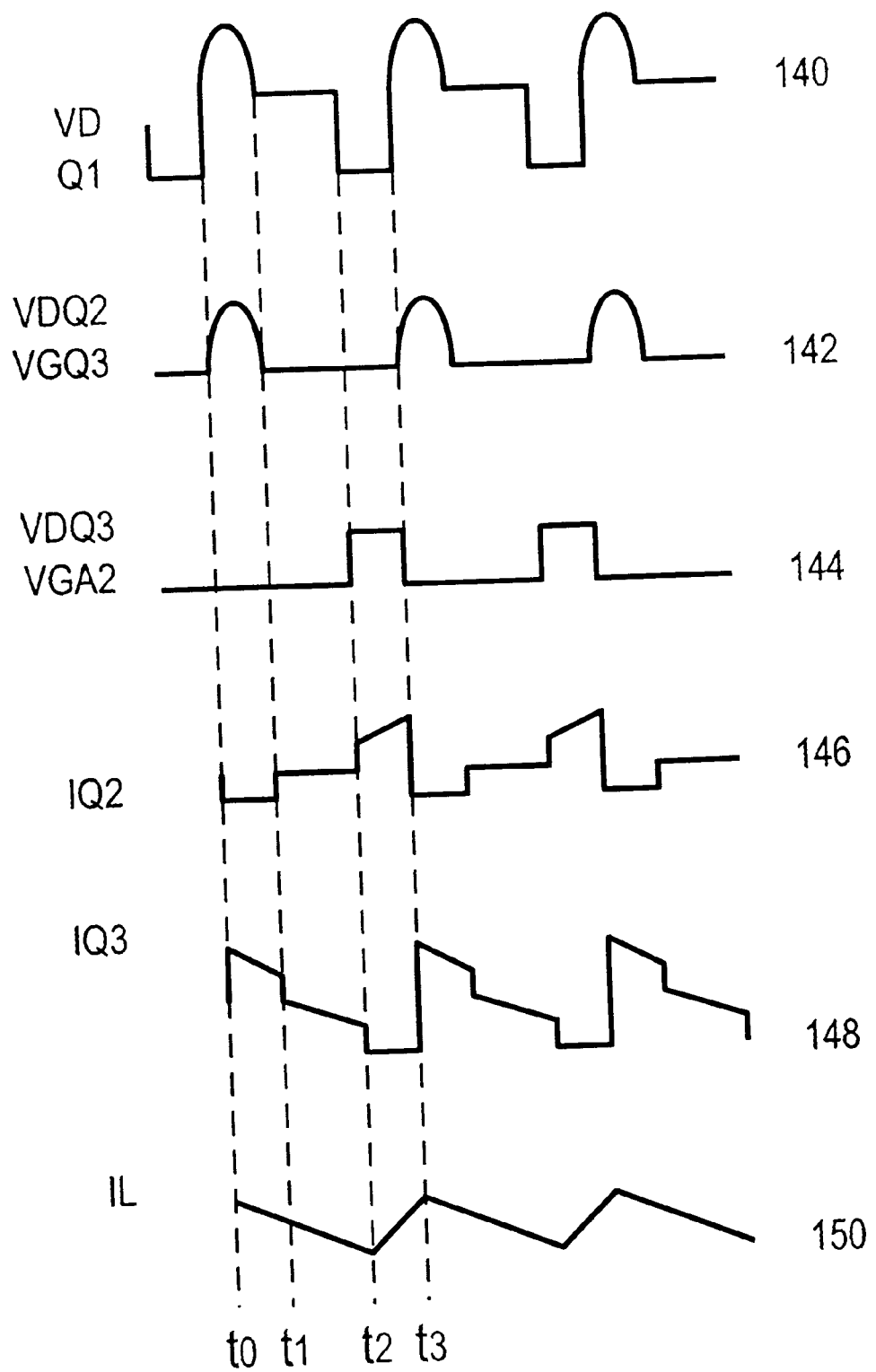
FIG. 1B is the voltage and current waveforms for the forward converter presented in FIG. 1A.

The diode 354 prevents any current flow back flow when VDQ2 382 exceeds $V_{cc}$ 329. As in the other preferred embodiments of the present invention, during the dead time period (t1 to t2) both MOSFET rectifiers Q2 318 and Q3 322 are on and both carry the inductor 324 current. As before the body diode of Q3 is not conducting during the dead time. At t2 the power transferring cycle begins, Q2 318 was turned on at t1. The momentary turn-on of the body diode of Q2 described for the self-synchronized synchronous rectifiers in FIG. 1A is eliminated. At t2 the positive edge of the output pulse of PWM 302 through capacitor 308, transformer T2 315 and capacitor 344 momentarily turns on Q7 340 and turns off Q3 322.

It should be noted that all the bipolar transistors have an off-state bias and at turn-on the converter will operate through the body diodes of the synchronous rectifiers for a few cycles until $V_{cc}$ reaches voltage levels above the MOSFET rectifiers' threshold voltage.

The circuit design in FIG. 5A is very flexible. The propagation delay of the output pulse of PWM 302 can be tailored for either the positive or negative edge of the pulse through the R-C resistor networks for each and every bipolar transistor. Base or gate series resistors (not shown) can also be adjusted with a parallel small signal-switching diode.

The invention in FIG. 5A offers high efficiency for an unclamped forward converter. It eliminates the need for gate voltage limiters and runs cooler than prior art designs, thereby improving reliability.

The pulse transformer T2 315 can be eliminated if input to output isolation is not required. It can be replaced with a high-voltage capacitor diode combination or any other fast-isolation signal buffer. In other preferred embodiments, the bipolar transistor drivers and their associated components can be constructed in an integrated circuit package that will further improve reliability and power density.

SELF-DRIVEN ACTIVE CLAMP

In prior art, the active clamp in DC/DC converters has been used to reduce the voltage stress of the primary transistor switch in forward/flyback converters by allowing the magnetic current to circulate and reset the power transformer core. An additional benefit of the active clamp is the improvement of the efficiency of the converter because part of the energy required to reset the power transformer core is returned back to the input source powering the converter.

In prior art, the active clamp consists of a power MOSFET connected in series with the storage capacitor. The transistor is driven by a control signal generated from the PWM, located at either in-put or output section of the converter. Depending on the location of the active clamp and the type of MOSFET (N channel, P channel), additional components and specific timing between the PWM main power transistor driving signal and that of the active clamp is required. But, such particular circuit designs are well known in the art.

A self-driven active clamp (SDAC) offers all the benefits of the prior art with fewer components, lower cost and higher reliability. As in prior art, the active clamp can be an N channel or P channel MOSFET; it can be placed at either input or output section of the converter; and it will operate with virtually any power conversion circuit designs.

Figure 6:
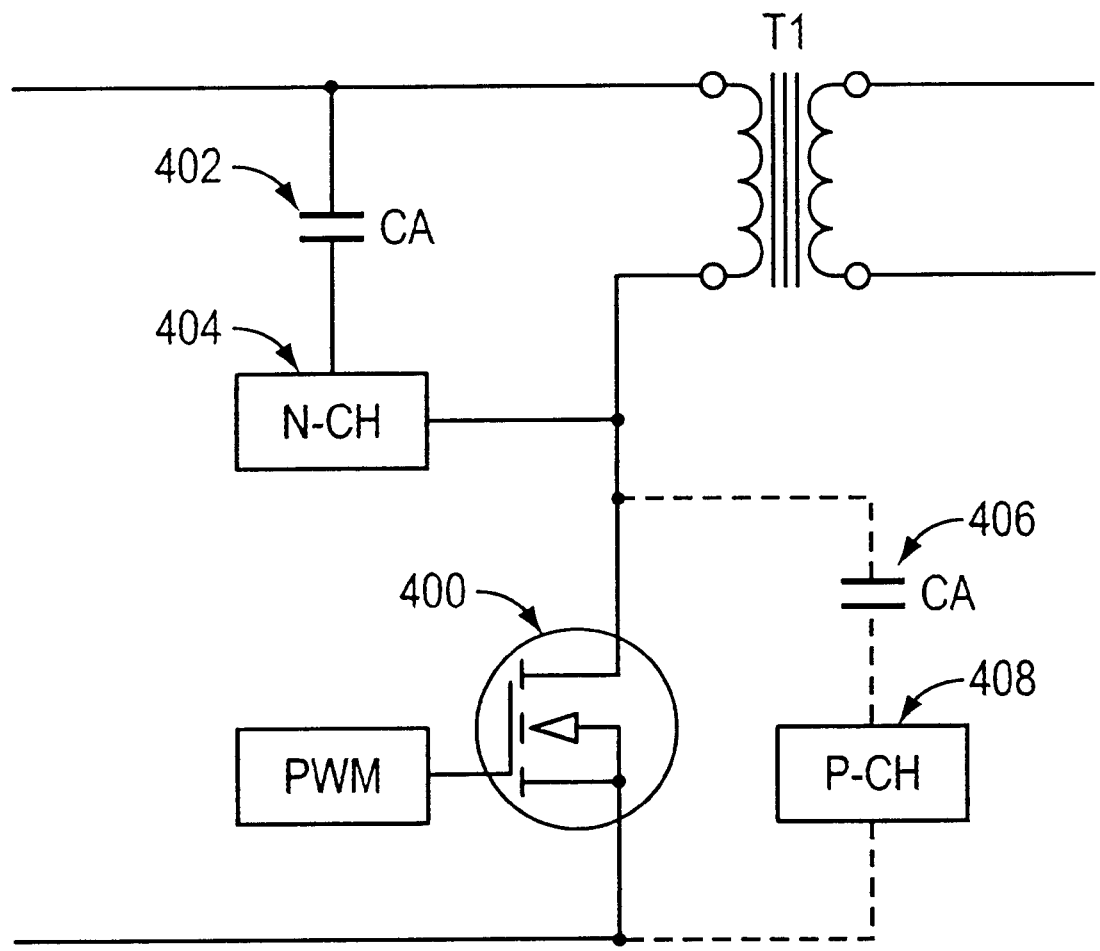
FIG. 6 is a block diagram of a self-driven active clamp utilizing either N or P channel MOSFET.

In FIG. 6, a block diagram is given for both N channel and P channel (dotted line) self-driven active clamps. The N channel SDAC 404 and the P channel SDAC 408 are shown as a 2-terminal device connected in series to storage capacitor CA 402 and CA 406, respectively.

Figure 7A:
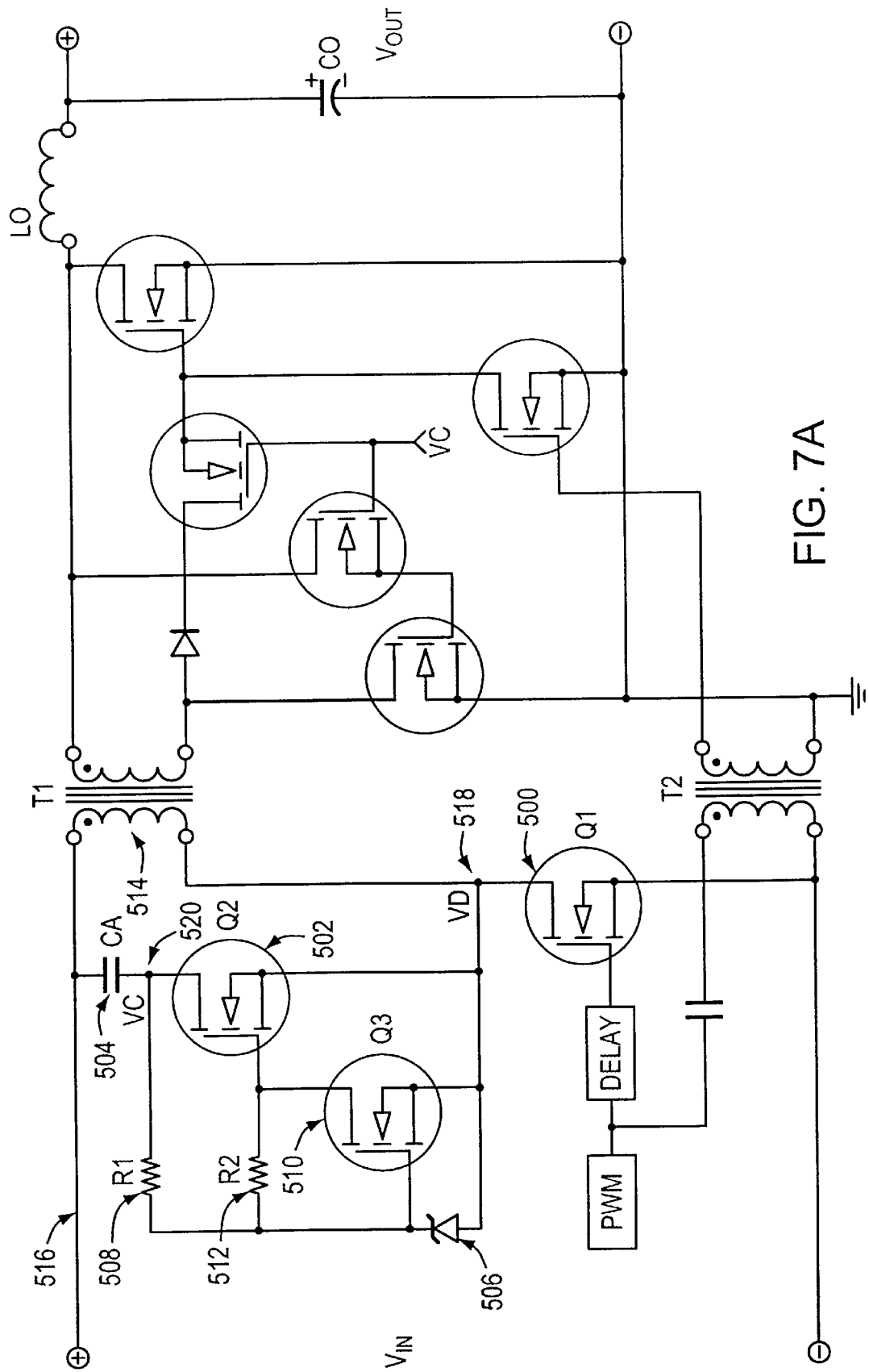
FIGS. 7A and 7B are schematics and associated waveforms of the forward converter with improved synchronous rectification and an N channel self-driven active clamp.
Figure 7B:
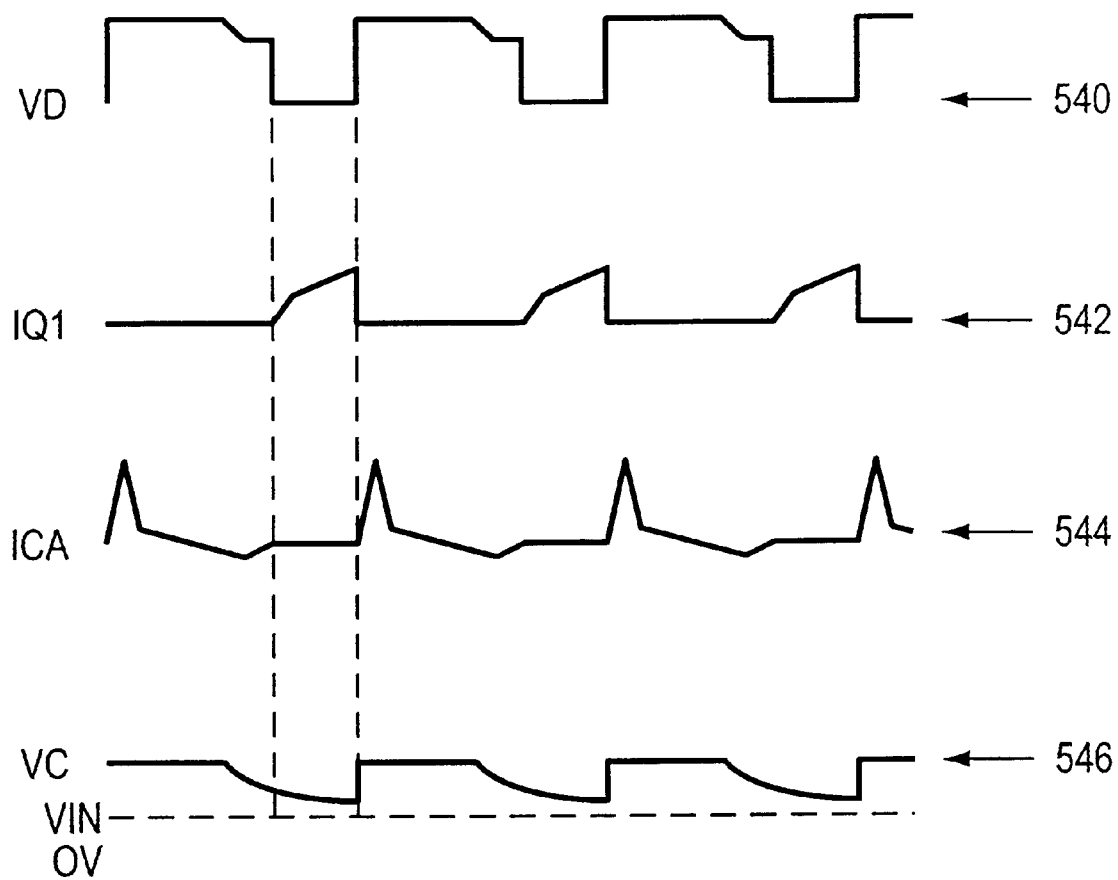

In FIG. 7A, a schematic of an N channel SDAC is given, and the associated voltage and current waveforms traces are presented in FIG. 7B. Referring to FIG. 7A, after Q1 500 turns off, the voltage at node VD 518 starts to increase from zero volts. When VD 518 becomes one diode drop more positive than VC 520, the parasitic body diode of Q2 502 (not shown) starts charging CA 504. At the same time, the gate to source capacitors of Q2 502 and Q3 510 are charged to VD 518 voltage, Q2 502 through the parasitic diode of Q3 510 and Q3 through the zener diode 506.

After VC 520 reaches its peak value, determined by the leakage current path formed by R1 508 and zener 506, current starts to flow from VC 520 back to the positive Vin terminal 516 through the primary of T1 514 discharging CA 504. When the threshold of Q2 502 is reached, the channel of Q2 starts to conduct current from CA 504 and resets the transformer core. Transistor Q3 510 turns off Q2 at the end of the transformer core resetting period. The zener diode 506 also protects the gates of Q3 510 and Q2 502.

Resistor R2 512 biases the gate of Q2 depending on the input voltage, the selected value of CA 504, switching frequency of the converter and the parasitic capacitors of Q2 502 and Q3 510. The bias resistors R1 508 and R2 512 are large compared to the on resistance of Q2 502 and Q3 510.

At the beginning of the on period when VD 518 drops to zero volts due to Q1 being on, the gate to source voltage of Q3 is clamped by the zener diode 506 turning Q3 510 completely on and Q2 off. The gate to source capacitance of Q3 is also discharged through Q1 500.

During the on time of Q1 510, capacitor CA 504 continues to discharge through R1 and zener diode 506 to ground through Q1 500. During this on period, Q3 510 must remain on to keep Q2 502 off. For those familiar with the art, it will be obvious that Q2 502 and Q3 510 can be replaced by bipolar transistors with appropriate biases.

In FIG. 7B, the voltage and current waveforms from FIG. 7A are shown. Specifically, VD 540 is the drain voltage of Q1 500, the current through Q1 500 is given as IQ1 542, the current through CA 504 is given as ICA 544, and the voltage VC 520 is given as VC 546.

Figure 8:
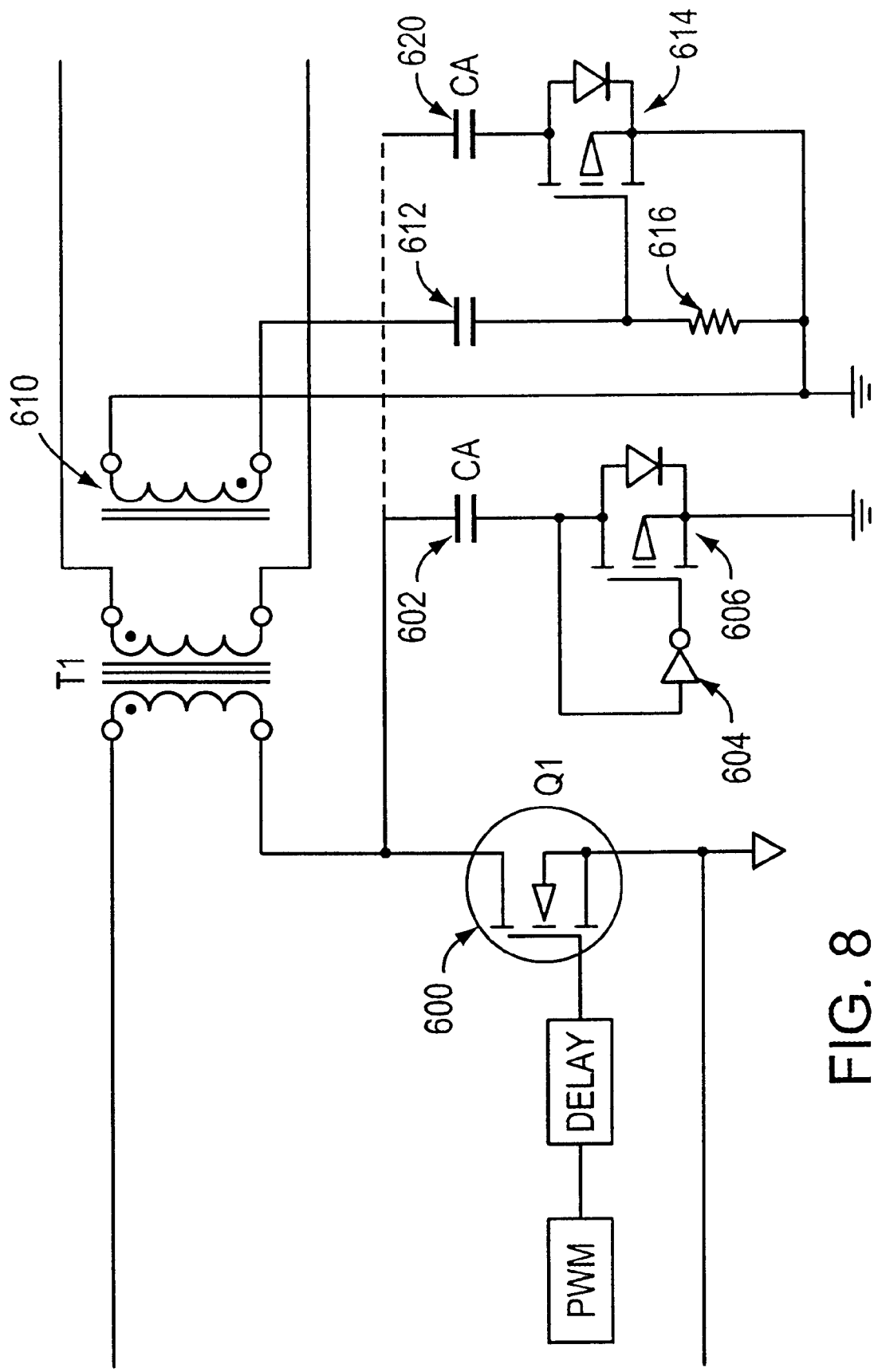
FIG. 8 is a schematic of two versions of a P channel self-driven active clamp.

In FIG. 8, two different versions of a P channel SDAC are presented: the first version consists of CA 602 inverter 604 and P channel MOSFET 606 with its parasitic diode shown. The second version (dotted) consists of CA620 auxiliary winding 610 in series with capacitor 612, resistor 616 and a P channel MOSFET 614 with its parasitic diode shown.

In the second version, the signal inversion for the gate signal drive of MOSFET 614 is accomplished through the auxiliary transformer winding 610, while capacitor 612 and resistor 616 perform the scaling of the gate signal. Both N and P channel SDACs can be used with any of the preferred embodiments of the forward converters discussed previously with respect to FIGS. 2, 3 and 4.

A distinction between the inventive SDAC and the prior art is that the driving signal for the SDAC is not turned on "prior to the on period of the primary switch 10 and closed after this period," as stated in U.S. Pat. No. 4,441,146 on page 5, lines 36–40. All control signals for the inventive SDAC are derived from the signal generated from the primary switch. It should also be noted that even if the SDAC has a dead time period, the inventive synchronous rectification embodiments disclosed herein will improve efficiency and reduce costs.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A forward DC/DC converter comprising:
   a first transformer defining an input winding with a first and a second input winding lead and a corresponding output winding with a first and a second output winding lead,
   a power source defining a first and a second terminal with the first terminal connected to the first input winding lead
   a switch connected between the second power source terminal and the second input winding lead, the switch defining an activation input,
   a pulse width modulator defining an output signal,
   a delay circuit accepting the output signal and providing a delayed output signal to the activation input,
   a second transformer with an input winding connected to receive the output signal, the second transformer providing a second transformer output signal winding,
   an inductor connected between the first output winding lead of the first transformer and a load, the load connected to a reference point,
   a first MOSFET source connected to the reference point and a drain to the second output winding lead of the first transformer, the first MOSFET completes the circuit from the inductor and the load through the output winding of the first transformer, the first MOSFET defining a first gate,
   a connection from the first output winding lead of the first transformer to the first gate,
   a second MOSFET source connected to the reference point and a drain connected to the first output winding lead, the second MOSFET connected across the inductor and the load wherein the second MOSFET completes a circuit, the second MOSFET defining a second gate,
   a diode with an anode connected to the drain of the first MOSFET and a cathode to the gate of the second MOSFET, the diode performing voltage peak detection and holding, the peak voltage driving the gate of the second MOSFET,
   a third MOSFET source connected to the reference point and a drain connected to the gate of the second MOSFET, the third MOSFET defining a third gate, and
   a connection from the second transformer output signal winding to the third gate.

2. The forward DC/DC converter as defined in claim 1 further comprising
   a control voltage,
   a fourth and a fifth MOSFET each defining gates that are connected to the control voltage,
   the fourth MOSFET defining a drain connected to the first transformer output winding lead and the fourth MOSFET defining a source connected to the gate of the first MOSFET, and
   the fifth MOSFET defining a source connected to the gate of the second MOSFET and the fifth MOSFET defining a drain connected to the cathode of the diode.

3. The forward DC/DC converter as defined in claim 2 wherein the control voltage emanates from an additional winding on the first transformer.

4. A forward DC/DC converter comprising:
   a first transformer defining an input winding with a first and a second input winding lead and a corresponding output winding with a first and a second output winding lead,
   a power source defining a first and a second terminal with the first terminal connected to the first input winding lead,
   a switch connected between the second power source terminal and the second input winding lead, the switch defining an activation input,
   a pulse width modulator defining an output signal
   a delay circuit accepting the output signal and providing a delayed output signal to the activation input,
   a second transformer with an input winding connected to receive the output signal, the second transformer providing a second transformer output signal winding,
   an inductor connected between the first output winding lead of the first transformer and a load, the load connected to a reference point,
   a first MOSFET source connected to the reference point and a drain to the second output winding lead of the first transformer, the first MOSFET completes the circuit from the inductor and the load through the output winding of the first transformer, the first MOSFET defining a first gate,
   a connection from the first output winding lead of the first transformer to the first gate,
   a second MOSFET source connected to the reference point and a drain connected to the first output winding lead, the second MOSFET connected across the inductor and the load wherein the second MOSFET completes a circuit, the second MOSFET defining a second gate,
   a first edge triggered circuit accepting the drain signal from the first MOSFET and driving the gate of the first MOSFET, and a second edge triggered circuit accepting the second transformer output signal and driving the gate of the first MOSFET, each of the first and second edge triggered circuits providing a different timed voltage pulse of opposite polarities, third and a fourth edge triggered circuits each accepting the second transformer output signal and both driving the gate of the second MOSFET, each of the third and fourth edge triggered circuits providing a different timed voltage pulse of opposite polarities, wherein the first, second, third and fourth edge triggered circuits charge and discharge the gate to source capacitances of the first and second MOSFETs, respectively, wherein the first and the second MOSFETs provide a current path for the inductor during the time when current is not being provided by the first transformer.

* * * * *

UNITED STATES PATENT AND TRADEMARK OFFICE
CERTIFICATE OF CORRECTION

PATENT NO.    : 6,473,317 B1
DATED         : October 29, 2002
INVENTOR(S)   : Anastasios V. Simopoulos It is certified that error appears in the above-identified patent and that said Letters Patent is hereby corrected as shown below:

<u>Title page,</u>
Item [75], inventor's name, replace "A." with -- V. --.

Signed and Sealed this

Fourth Day of March, 2003

JAMES E. ROGAN
*Director of the United States Patent and Trademark Office*